United States Patent Office 3,020,126
Patented Feb. 6, 1962

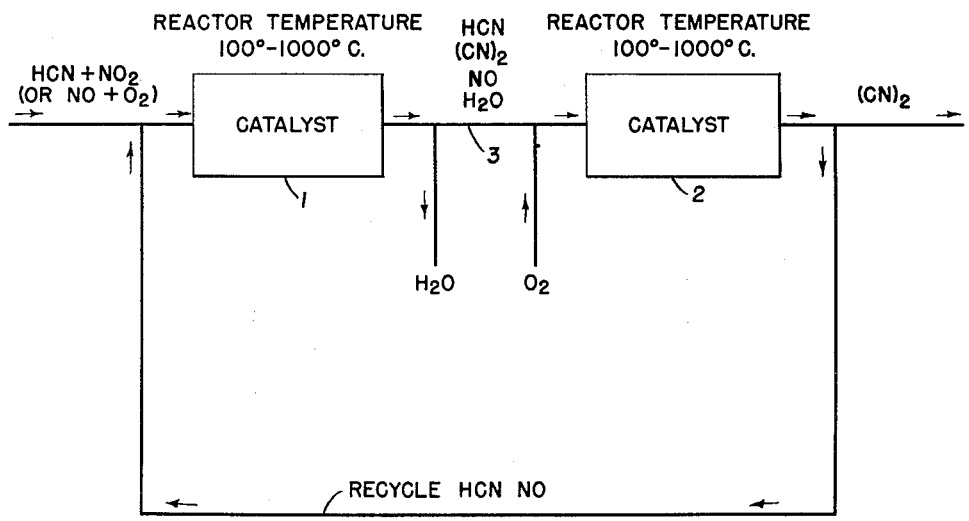
CATALYZED NO₂ OXIDATION OF HCN TO (CN)₂
INVENTORS
WILLIAM L. FIERCE
WALTER J. SANDNER
BY
ATTORNEY

3,020,126
PREPARATION OF CYANOGEN
William L. Fierce, Crystal Lake, and Walter J. Sandner, Carpentersville, Ill., assignors to The Pure Oil Company, Chicago, Ill., a corporation of Ohio
Filed Nov. 12, 1959, Ser. No. 852,444
11 Claims. (Cl. 23—151)

This invention relates to new and useful improvements in processes for the preparation of cyanogen. In particular, this invention is concerned with a process for preparing cyanogen by the catalyzed reaction of hydrogen cyanide with a nitrogen oxide using process conditions and apparatus which result in substantially enhanced yields of cyanogen.

In our Patent 2,884,308, we have described a process for the preparation of cyanogen by the catalyzed reaction of hydrogen cyanide with a nitrogen oxide (e.g., $NO_2$, $N_2O_3$, etc.) having an oxidation state higher than nitric oxide (NO). The reaction can be represented by the following equation:

$$2HCN + NO_2 \rightarrow (CN)_2 + H_2O + NO$$

It is known that NO can be readily oxidized to $NO_2$ by oxygen in the temperature range covered by the aforementioned patent and even at lower temperatures. The reaction is as follows:

$$NO + \tfrac{1}{2}O_2 \rightarrow NO_2$$

If the two reactions, viz., oxidation of hydrogen cyanide and reoxidation of by-product nitric oxide, could be made to occur simultaneously, our process for preparation of cyanogen would be greatly improved. The net effect would be that the nitric oxide (NO) would act as an oxygen carrier in the reaction and consequently much less nitric oxide would be needed in the process. If the two reactions could be made to occur simultaneously, there would be no net consumption of the nitrogen oxide and the overall reaction would consist essentially of the oxidation of hydrogen cyanide by oxygen to produce cyanogen and water, with the nitric oxide continually being reoxidized to form nitrogen dioxide which functions as the oxidant for the hydrogen cyanide.

It is therefore one object of this invention to provide an improved process for the preparation of hydrogen cyanide by the catalyzed reaction of hydrogen cyanide and nitrogen dioxide, or a mixture of nitric oxide and oxygen.

Another object of this invention is to provide an improved process for the preparation of cyanogen by the catalyzed reaction of hydrogen cyanide and nitric oxide or nitrogen dioxide, in admixture with oxygen under conditions which cause by-product nitric oxide to be reoxidized for further reaction with unreacted hydrogen cyanide in the process.

A feature of this invention is the provision of an improved process for the catalyzed reaction of hydrogen cyanide, oxygen, and nitric oxide or nitrogen dioxide, by passing a mixture of the reactants through a plurality of reaction zones heated to an effective reaction temperature and containing an oxidation catalyst for the process, the reaction zones being separated by unheated, catalyst-free zones in which by-product water is condensed and removed, and recovering cyanogen from the reaction effluent.

Another feature of this invention is the provision of an improved process for the preparation of cyanogen in which hydrogen cyanide, oxygen, and nitric oxide or nitrogen dioxide, in admixture are passed through a plurality of reaction zones, each containing an oxidation catalyst for the process, in which the reaction zones are separated by unheated, catalyst-free zones into which additional oxygen is introduced and from which by-product water is condensed and removed.

Other objects and features of this invention will become apparent from time to time throughout the specification and claims as hereinafter related.

In the accompanying drawing, to be taken as part of this specification, there is shown a flow diagram illustrating the conditions and apparatus used in our improved process for the catalyzed oxidation of hydrogen cyanide by nitrogen dioxide.

In accordance with our improved process, hydrogen cyanide and nitric oxide or nitrogen dioxide, in admixture with oxygen, are passed through a plurality of reaction zones 1 and 2, each containing a catalyst capable of accelerating the oxidation of hydrogen cyanide by nitrogen dioxide. The reaction zones (which may be separate reactors) are maintained at a temperature, preferably in excess of 100° C. and not exceeding about 1000° C., sufficient to effect reaction between the nitrogen dioxide and the hydrogen cyanide to produce cyanogen. The catalyst-containing reaction zones are separated by catalyst-free zone 3, which may be an empty container, conduit, or trap, which is unheated and provides a point for condensation and removal of by-product water and for introduction of additional oxygen. The cyanogen produced in the reaction is recovered by condensation from the reaction effluent and unreacted hydrogen cyanide, oxygen, and nitrogen dioxide (or nitric oxide) are recycled to the first reactor for further reaction, together with additional quantities of hydrogen cyanide, nitrogen oxide, and oxygen, if needed.

In carrying out this process, the reaction conditions described in our Patent 2,884,308 may generally be followed. Thus, any suitable reactor may be used made of any material which is not attacked by the reactants and reaction products. The temperature of the reaction is not critical and may vary from as low as 100° to as high as 1000° C., depending upon the particular catalyst used and the flow rate and other process conditions. The rate of flow of reactants is not critical and the gaseous hourly space velocity of the reactants may vary from about 50 to 2000, or even higher. Space velocity of reactants is defined as the ratio of the volume of the reactant gases (S.T.P.) charged per hour to the volume of the reaction space of a single reactor. If space velocity is to be based on total reactor volume, it is so indicated. Where additional gas (e.g., oxygen) is introduced at a point between reactors, the space velocity in the second reactor is greater than in the first reactor. The reaction is preferably carried out at atmospheric pressure, although subatmospheric or superatmospheric pressures may be used, if desired. The catalysts which are effective in this process include any or all of the catalysts mentioned in our Patent 2,884,308 and, in general, include any oxidation catalyst which is effective in accelerating the oxidation of hydrogen cyanide by nitrogen dioxide to produce cyanogen. In particular, these catalysts include the oxides and salts of strong acids of metals of groups I and II of the periodic table, e.g., sodium oxide, potassium oxide, lithium oxide, barium oxide, calcium oxide, magnesium oxide, strontium oxide, magnesium chloride, calcium chloride, potassium chloride, trisodium phosphate, tripotassium phosphate, calcium nitrate, strontium nitrate, and mixed oxides, such as lime-glass beads. The catalysts are preferably supported on an inert support, such as pumice or a porous refractory oxide.

The following non-limiting examples are illustrative of the scope of this invention:

*Example I*

In one experiment, we carried out the oxidation of hydrogen cyanide under conditions substantially the same as described in our Patent 2,884,308. In this experiment, hydrogen cyanide, nitric oxide (NO), and excess oxygen, in admixture with helium diluent, were charged to a reactor which consisted of an electrically-heated, vertically-mounted Vycor tube having a length of 12 in. (30.5 cm.), an outside diameter of ⅞ in. (2.22 mm.), and a reaction volume of 92 cc. The reactor was charged with 33.6 g. of a catalyst which was prepared by impregnating pumice with 10% wt. of magnesium chloride. The catalyst was prepared by impregnation of the pumice with a concentrated aqueous solution of magnesium chloride followed by drying at an elevated temperature in air. There was indication that the catalyst consisted predominantly of magnesium oxide due to reaction of the magnesium chloride. In this experiment, the reactants were fed at a gaseous hourly space velocity of 296 for a period of 20 minutes through the catalyst-containing reaction zone at a temperature of 277° C. The mol ratio of hydrogen cyanide to nitric oxide to oxygen was 5.3:1:9.8. Thus, the oxygen present was sufficient to convert the nitric oxide initially to nitrogen dioxide for reaction with the hydrogen cyanide, and theoretically was sufficient to convert the byproduct nitric oxide to nitrogen dioxide for further reaction with unreacted hydrogen cyanide. In this experiment, 44.1% of the hydrogen cyanide was consumed. Cyanogen was obtained in a molar yield of 19.5%, based on the hydrogen cyanide, or 102.5%, based on the nitric oxide. The selectivity for formation of cyanogen was 88.3%, based on the hydrogen cyanide consumed in the reaction. Selectivity is defined as the percentage of the hydrogen cyanide consumed which appear as the product, cyanogen. It may also be considered as the ultimate yield if oll unreacted hydrogen cyanide were recycled.

In another experiment, using the same reactor and fresh catalyst, a mixture of hydrogen cyanide, nitric oxide, oxygen, and helium diluent were fed through the reactor at a gaseous hourly space velocity of 162 for a period of 30 minutes at 282° C. In this experiment, the mol ratio of hydrogen cyanide to nitric oxide to oxygen was 6:1:11.2. In this experiment, 43.6% of the hydrogen cyanide was consumed and cyanogen was obtained in a yield of 17.8%, based on the hydrogen cyanide charged, or a yield of 107%, based on nitric oxide charged. The selectivity for formation of cyanogen was 81.6%, based on the hydrogen cyanide consumed in the reaction.

In these two experiments, the nitric oxide (or nitrogen dioxide produced by reaction with the oxygen) was effective in the presence of the catalyst to oxidize a substantial amount of the hydrogen cyanide to cyanogen. However, the yield of cyanogen based on the nitric oxide charged indicates that the nitric oxide is not reoxidized to nitrogen dioxide for further reaction with unreacted hydrogen cyanide under the conditions used in the experiments.

*Example II*

In another experiment, two reactors, each containing 16.8 g. of the catalyst used in Example I, were mounted in series and were separated by an unheated, empty, 1-liter vessel. The reactors were Vycor tubes, as in Example I, and were electrically heated to the same reaction temperature. Gas samples were taken for mass spectrometric analysis of the charge gas to the first reactor and the product gas from the second reactor. In this experiment, a mixture of hydrogen cyanide, nitric oxide, excess oxygen, and helium diluent were fed through the reactors at a gaseous hourly space velocity of 422 (if the space velocity is calculated on the total volume of the two reactors, it would be half this value) for a period of 40 minutes at a reaction temperature of 278° C. In this experiment, the mol ratio of hydrogen cyanide to nitric oxide to oxygen was 5.2:1:9.5. Water was observed to condense in the unheated, catalyst-free zone (the 1-liter vessel) between the catalyst-containing reactors. In this experiment, the consumption of hydrogen cyanide was 66.8% and resulted in the production of cyanogen in a yield of 32.8%, based on hydrogen cyanide charged, or a yield of 171%, based on the nitric oxide charged. The selectivity for formation of cyanogen was 98.6%, based on the hydrogen cyanide consumed in the reaction.

In another run, using the same apparatus and catalyst, a mixture of hydrogen cyanide, nitric oxide, excess oxygen, and helium diluent were passed through the reactors for a period of 40 minutes at a gaseous hourly space velocity of 610 (based on the reaction volume of a single reactor) at a reaction temperature of 290° C. In this experiment, the mol ratio of hydrogen cyanide to nitric oxide to oxygen was 4.4:1:8.1. The hydrogen cyanide was consumed in the reaction to the extent of 62.0% and produced a cyanogen yield of 32.8%, based on hydrogen cyanide charge, or 143%, based on nitric oxide charged. The selectivity for cyanogen was 105%, based on hydrogen cyanide consumed in the reaction.

In these two experiments, it was observed that by carrying out the oxidation of hydrogen cyanide using nitric oxide and excess oxygen, substantially quantitative yields of cyanogen can be obtained with a minimum amount of nitric oxide by passing the reactants through a plurality of separate reaction zones, each filled with catalyst and maintained at the desired reaction temperature and separated by a catalyst-free zone. By carrying out the process in this manner, it is possible to utilize the oxygen to a greater extent in reoxidizing the byproduct nitric oxide to nitrogen dioxide for further reaction with unreacted hydrogen cyanide, and thus obtain greater conversions of hydrogen cyanide and greater yields of cyanogen per pass through the reactor. While these experiments have been described in connection with a series of two reactors, the process may be carried out using three or more reactors, each of which is maintained at the desired reaction temperature and each of which contains an oxidation catalyst. In such an apparatus, the reactors are separated by zones (which may be conduits, cold traps, or empty reactors) which contain no catalyst and which are preferably unheated and thus provide a point for condensation of by-product water. When three or more reactors are used in carrying out this process, even higher conversions of hydrogen cyanide and higher yields of cyanogen per pass through the reactor system are obtained.

*Example III*

In another experiment, using the apparatus of Example II and fresh catalyst, as used in that example, a mixture of hydrogen cyanide, nitrogen dioxide, and oxygen, together with helium diluent, was introduced into the reactor system. As in the previous example, the reactors were maintained at the same temperature and were separated by an unheated zone, consisting of an empty, 1-liter vessel, in which by-product water was condensed. In this experiment, though, only hydrogen cyanide, and nitrogen dioxide, were fed to the first reactor in a mol ratio of 2.7:1. The oxygen was introduced at a point between the two catalyst-containing reactors thus resulting in a space velocity in the second reactor which was higher than that in the first reactor. The space velocity in the first reactor was 620, based on the volume of that reactor, while the space velocity in the second reactor was about 700, based on the volume of the second reactor. The reaction was carried out for a period of 30 minutes at 287° C. In this run, 92.0% of the hydrogen cyanide was consumed and cyanogen was obtained in a yield of 49.6% per pass, based on hydrogen cyanide charged, or a yield of 134% per pass, based on nitrogen dioxide charged. The selectivity for formation of cyanogen was 108%, based on hydrogen cyanide consumed. The selectivity for formation of hydrogen cyanide in this process is therefore substantially quantitative and is in excess of 100% as the result of minor analytical errors.

In another experiment, using the same apparatus and the same catalyst, a mixture of hydrogen cyanide, and nitrogen dioxide, together with helium diluent, were passed through the reactor at a gaseous hourly space velocity of 600, based on the volume of the first reactor, and gaseous hourly space velocity of 688 through the second reactor, based on the volume of that reactor. The increased space velocity in the second reactor resulted from the addition of oxygen at a point between the reactors. In this experiment, the ratio of hydrogen cyanide to nitrogen dioxide charged to the first reactor was 4.5:1.0. In this experiment, hydrogen cyanide was consumed to the extent of 96.3% and cyanogen was obtained in a yield of 52.1% per pass, based on hydrogen cyanide, or 236%, based on nitrogen dioxide. The selectivity for formation of cyanogen based on hydrogen cyanide was 108%.

In these two examples, it is seen that by using two catalyst-containing reactors in series, separated by an unheated reaction zone in which water is condensed and additional oxygen is added, it is possible to obtain an almost complete conversion of the hydrogen cyanide and quantitative yield of cyanogen based on the hydrogen cyanide consumed in the reaction. The yields of hydrogen cyanide per pass based on nitrogen dioxide, which are substantially in excess of 100%, represent the additional yield which results from a reoxidation of the by-product nitric oxide which then reacts further with unreacted hydrogen cyanide to produce additional quantities of cyanogen. It is seen that the higher the ratio of hydrogen cyanide to nitric oxide or nitrogen dioxide, the higher the yield of cyanogen based upon the nitrogen dioxide. It, therefore, appears quite likely that the nitrogen dioxide could be reduced to a very small proportion of the total reaction mixture and the hydrogen cyanide quantitatively converted to cyanogen by passing it in admixture with the nitric oxide or nitrogen dioxide and oxygen through a series of reactors which are separated by unheated zones from which water is condensed and into which additional quantities of oxygen may be introduced.

*Example IV*

When the experiments of Examples II and III are repeated substituting different catalysts which are known to be effective in accelerating the oxidation of hydrogen cyanide by nitrogen dioxide to produce cyanogen, results are obtained which are substantially identical to those in the previous examples. Thus, when lime-glass beads, calcium oxide, magnesium oxide or magnesium chloride (supported on pumice), or metallic silver supported on corundum are substituted in the two reactors and the mixture of hydrogen cyanide, nitric oxide (or nitrogen dioxide), and oxygen, together with helium diluent, are passed through the reactors in series and by-product water is condensed out in the catalyst-free intermediate zone, cyanogen is obtained in substantially quantitative yields, based upon the hydrogen cyanide consumed in the reaction. This process is therefore applicable to the oxidation of hydrogen cyanide by nitric oxide or nitrogen dioxide in admixture with oxygen using any suitable oxidation catalyst at temperatures which are high enough to effect oxidation of the hydrogen cyanide without oxidizing it completely to carbon dioxide and water. This process, as described herein, is highly selective for the formation of cyanogen and there is substantially no loss of product due to formation of unnecessary by-products. When catalysts are used which are less efficient than those described herein, the process is still operative as described, but may require additional catalyst-containing reaction vessels through which the reactants must pass in order to obtain a maximum conversion of the hydrogen cyanide to cyanogen.

From the foregoing examples and from other experiments, we have found that hydrogen cyanide can be quantitatively converted to cyanogen at a high rate of conversion per pass using the apparatus described herein. In this process, using the apparatus described (or its equivalent), a mixture of hydrogen cyanide and nitrogen dioxide or nitric oxide and oxygen, either with or without a diluent gas, such as helium, is passed into the first of a series of catalyst-containing reactors, designated 1 in the flow diagram. The reactor contains a suitable oxidation catalyst of the type above-described or of the type described in our Patent 2,884,308 and is maintained at a temperature in the range from about 100°–1000° C. which is sufficient to result in the oxidation of the hydrogen cyanide by the nitrogen dioxide. In reactor 1, a substantial portion of the hydrogen cyanide is oxidized by the nitrogen dioxide (which is present either in the initial feed or as a result of reaction of nitric oxide with oxygen) to produce cyanogen, water, and nitric oxide. The effluent from reactor 1 passes into catalyst-free zone 3 between reactors 1 and 2 in which by-product water is condensed and additional oxygen may be added. The by-product nitric oxide is reconverted to nitrogen dioxide in the absence of catalyst and at a higher rate when water is condensed from the reaction effluent. This reaction mixture passes into reactor 2 which contains more of the oxidation catalyst and is maintained at the same reaction temperature, or any other temperature sufficient to effect reaction between nitrogen dioxide and the remaining hydrogen cyanide. From reactor 2, cyanogen is recovered as the product and unreacted hydrogen cyanide (if any) and nitric oxide together with some by-product water and oxygen are recycled to the first reactor together with additional quantities of hydrogen cyanide. Once this reaction is started, additional quantities of nitrogen dioxide are not required since the nitric oxide by-product from the second reactor is reoxidized to nitrogen dioxide and recycled through the system. When milder oxidation catalysts are used, or at lower reaction temperatures, or at higher flow rates of reactants, it may be desirable to use three or more reactors in series. When three or more reactors are used, each contains the oxidation catalyst and is maintained at the desired reaction temperature. In the catalyst-free zone between the reactors, provision is made for removal of water which condenses therein, and provision may be made for introduction of additional quantities of oxygen at one or more points between the reactors. While the reaction temperature used in the reactors may be any suitable temperature in the range from 100°–1000° C., reaction temperatures in the range from about 250°–400° C. are preferred, since a very high yield of cyanogen is obtained in this range without danger of excessive oxidation of the hydrogen cyanide to form water and carbon dioxide.

While we have described our invention fully and completely with special emphasis upon several preferred embodiments thereof, we wish it to be understood that within the scope of the appended claims this invention may be practiced otherwise than as specifically described herein.

The embodiments of the invention in which an exclusive property or privilege is claimed are defined as follows:

1. A process for the preparation of cyanogen which comprises contacting a mixture of hydrogen cyanide, oxygen, and an oxide of nitrogen selected from the group consisting of nitric oxide and nitrogen dioxide, in a plurality of separate reaction zones, with a plurality of portions of a catalyst capable of accelerating the oxidation of hydrogen cyanide by the nitrogen oxide, at a temperature of about 100°–1000° C., sufficient to effect reaction between the nitrogen oxide and hydrogen cyanide, cooling said mixture in catalyst-free zones between said reaction zones to a temperature at which by-product water is condensed and removed from said mixture, and recovering cyanogen from the reaction effluent from the last of the reaction zones.

2. A process in accordance with claim 1 in which the nitrogen oxide reactant is nitric oxide, by-product water is condensed and removed in the catalyst-free zones, and additional oxygen is introduced into at least one of the catalyst-free zones.

3. A process in accordance with claim 1 in which the nitrogen oxide reactant is nitrogen dioxide, water is condensed and removed in the catalyst-free zones, and additional oxygen is introduced into at least one of the catalyst-free zones.

4. A process in accordance with claim 1 in which the hydrogen cyanide is present in a substantial molar excess over the nitrogen oxide.

5. A process in accordance with claim 1 in which the gaseous hourly space velocity of reactants is in the range of 50–2000.

6. A process in accordance with claim 1 in which additional oxygen is introduced at one of the catalyst-free zones.

7. A process in accordance with claim 1 in which unreacted hydrogen cyanide, oxygen, and nitrogen oxide are recycled from the last reaction zone to the first catalytic reaction zone.

8. A process in accordance with claim 1 in which the reaction temperature is 250°–550° C.

9. A process in accordance with claim 1 in which the catalyst contains at least one compound selected from the group consisting of oxides and salts of strong acids of metals of groups I and II of the periodic table.

10. A process in accordance with claim 9 in which the catalyst is magnesium chloride.

11. A process in accordance with claim 9 in which the catalyst is magnesium oxide.

References Cited in the file of this patent

UNITED STATES PATENTS 2,884,308   Fierce et al. _____ Apr. 28, 1959